(12) United States Patent
Frenkiel et al.

(10) Patent No.: US 8,150,567 B2
(45) Date of Patent: Apr. 3, 2012

(54) DEVICE FOR CONTROL OF RELATIVE POSITION(S) BY MEASUREMENTS OF POWER, FOR A SPACECRAFT OF A GROUP OF SPACECRAFT IN FORMATION

(75) Inventors: Roland Frenkiel, Toulouse (FR); Christian Mehlen, Etoile sur Rhone (FR)

(73) Assignee: Thales (FR)

( * ) Notice: Subject to any disclaimer, the term of this patent is extended or adjusted under 35 U.S.C. 154(b) by 689 days.

(21) Appl. No.: 12/160,224

(22) PCT Filed: Jan. 19, 2007

(86) PCT No.: PCT/EP2007/050552
§ 371 (c)(1),
(2), (4) Date: Mar. 12, 2009

(87) PCT Pub. No.: WO2007/082940
PCT Pub. Date: Jul. 26, 2007

(65) Prior Publication Data
US 2009/0222152 A1 Sep. 3, 2009

(30) Foreign Application Priority Data
Jan. 19, 2006 (EP) .................................. 06300041

(51) Int. Cl.
*B64G 1/24* (2006.01)
*G01S 1/00* (2006.01)
(52) U.S. Cl. ........ 701/13; 701/216; 701/300; 244/172.5
(58) Field of Classification Search .................... 701/13, 701/11, 216, 300, 301; 342/356, 424, 31; 244/172.5
See application file for complete search history.

(56) References Cited

U.S. PATENT DOCUMENTS
4,384,293 A * 5/1983 Deem et al. .................... 342/352
(Continued)

FOREIGN PATENT DOCUMENTS
EP 0432294 6/1991

OTHER PUBLICATIONS

Hilland, D. H. et al. "Satellite Threat Warning and Attack Reporting." Aerospace Conference, 1998 IEEE Snowmass At Aspen, CO, USA Mar. 21-28, 1998, New York, NY USA, IEEE, US, vol. 2, Mar. 21, 1998, pp. 207-217, XP010287133, ISBN: 0-7803-4311-5, Section 5: "Passive Direction Finding and Geolocation", Subsection "Amplitutde DF".

Primary Examiner — Tan Q Nguyen
(74) Attorney, Agent, or Firm — Lowe Hauptman Ham & Berner, LLP

(57) ABSTRACT

A control device (D) for a spacecraft of a group of spacecraft intended to travel in a chosen formation comprises i) a set of at least three send/receive antennas (A1-A3) installed on at least three differently oriented faces of its spacecraft and adapted to send/receive radio-frequency signals, ii) first measuring means (M1) responsible for determining the power of the signals received by each of the antennas (A1-A3) and for delivering sets of powers each associated with one of the other spacecraft of the group, iii) storage means (BD) responsible for storing sets of cartographic data each representative of the normalized powers of the signals received by each of the antennas (A1-A3) as a function of chosen send directions, and iv) processor means (MT) responsible for comparing each set of powers delivered by the first measuring means (M1) to the stored sets of cartographic data in order to estimate each send direction of the signals sent by the other spacecraft of the group with respect to a system of axes fixed with respect to their spacecraft.

19 Claims, 6 Drawing Sheets

U.S. PATENT DOCUMENTS 4,929,958 A     5/1990  Hodel et al.
5,810,297 A *   9/1998  Basuthakur et al. ....... 244/158.8
6,072,433 A *   6/2000  Young et al. .................. 342/386
7,894,948 B2 *  2/2011  Stroud ............................. 701/3

* cited by examiner

DEVICE FOR CONTROL OF RELATIVE POSITION(S) BY MEASUREMENTS OF POWER, FOR A SPACECRAFT OF A GROUP OF SPACECRAFT IN FORMATION

CROSS-REFERENCE TO RELATED APPLICATIONS

The present Application is based on International Application No. PCT/EP2007/050552, filed on Jan. 19, 2007, which in turn corresponds to European Application No. 06300041.8, filed on Jan. 19, 2006, and priority is hereby claimed under 35 USC §119 based on these applications. Each of these applications are hereby incorporated by reference in their entirety into the present application.

FIELD OF THE INVENTION

The invention concerns groups of spacecraft, for example satellites, intended to move in formation to execute a mission collectively, and to be more precise to control the relative positions of the spacecraft with respect to each other.

BACKGROUND OF THE INVENTION

As the person skilled in the art knows, some groups of spacecraft, for example satellites, must be positioned with respect to each other with some accuracy in order to execute a mission collectively. This positioning must be effected at the start of the mission, for example when placing the satellites in orbit. However, it can also be effected during the mission, either to effect a partial or total reconfiguration of the group or to alleviate a technical failure (or equipment breakdown) affecting one or more of the spacecraft.

To provide for such positioning, it has been proposed to equip each spacecraft (or at least those most important to the mission) with a control device including, on the one hand, send/receive antennas, possibly complemented by receive antennas, installed on differently oriented faces of the spacecraft and responsible for sending/receiving radio-frequency (RF) signals, and, on the other hand, an "RF sensor" including first measuring means for estimating received signal path differences between antennas, and processing means for estimating the send directions of the signals that are sent by the other spacecraft of the group (generally referred to as "line of sight axes"), from the powers of the received signals.

Such control device can also include second measuring means responsible for estimating each difference between their spacecraft and one of the other spacecraft of the group from the signals received by the antennas and auxiliary signals sent by the other spacecraft of the group and representing the respective distances that separate them from their spacecraft. In this case, the processing means can determine the relative positions of the spacecraft of the group with respect to a chosen system of axes, on the basis of the estimated distances and the estimated line of sight axes.

Finally, if the control device includes analysis means, it can detect risks of collision between spacecraft from the relative positions determined, or even propose avoidance maneuvers of its spacecraft as a function of these relative positions, and possibly reconfigure the entire formation once the faults and the risks of collision have been overcome.

If the antennas are installed at well-chosen locations (for example to limit multiple paths) and the first measuring means use a robust method of alleviating ambiguity of the path difference measurements, it is possible to obtain path differences of the order of a few millimeters and therefore send directions having an accuracy of the order of one degree.

For the control device to be able to operate in all directions and thus to determine any relative positions, each spacecraft must be equipped on a number of faces with antenna triplets (one send/receive antenna and two receive antennas). Now, firstly, installing antennas on spacecraft is difficult, secondly, the large number of antennas complicates the control device, and, thirdly, alleviating ambiguity in respect of the path differences is a complex process that is difficult to make compatible with the robustness and the reaction time that are necessary for collision detection.

It is undoubtedly possible to use other techniques for estimating any relative positions of spacecraft, for example LIDAR or RADAR, but those techniques are costly and complicated, or difficult to install on spacecraft, notably on satellites.

It is equally possible to use a technique for estimating any relative positions based on relative GPS (Global Positioning System). However, this solution is not always adapted to formation flight missions either because the altitude of the mission is too high relative to the altitude of the GPS constellation or because supplementary or independent positioning means are required.

No known solution proving entirely satisfactory, an object of the invention is therefore to improve on the situation.

SUMMARY OF THE INVENTION

To this end it proposes a control device for a spacecraft of a group of spacecraft intended to travel in a chosen formation, comprising a set of at least three send/receive antennas installed on at least three differently oriented faces of said spacecraft and adapted to send/receive radio-frequency signals, and processor means adapted to estimate the send directions of signals sent by the other spacecraft of the group on the basis of said signals received by said antennas, characterized in that it comprises first measuring means adapted to determine the power of the signals received by each of said antennas and to deliver sets of measurements of powers each associated with one of said other spacecraft of the group, and storage means adapted to store sets of cartographic data each representative of the powers of the signals received by each of said antennas as a function of chosen send directions, and in that said processor means are adapted to compare each set of powers delivered by said first measuring means to said stored sets of cartographic data so as to estimate each send direction of the signals sent by the other spacecraft of the group with respect to a system of axes fixed with respect to said spacecraft.

The device of the invention can have other features, separately or in combination, and in particular:

its first measuring means can be responsible for effecting signal to noise (S/N) ratio measurements for each of the received signals in order to determine their power;

it can comprise control means responsible, in the event of assignment of a send time period and a receive time period (complementary to each other) to each spacecraft of the group, in accordance with a chosen scheme, for dividing the send and receive time periods assigned to their spacecraft into numbers of send sub-slices and receive sub-slices each equal to the number of send/receive antennas of their spacecraft, and for assigning a send sub-slice to each of the send/receive antennas in accordance with a first chosen order and a receive sub-slice to each of the send/receive antennas according to a second chosen order; each send/receive antenna is then authorized to send during the send sub-slice assigned to it and to receive during the receive sub-slice assigned to it; moreover, each set of powers (delivered by the first measuring means) relates to signals received by the send/receive antennas during their respective receive sub-slices;

the control means can be responsible for varying the first chosen order and/or the second chosen order;

it can comprise second measuring means responsible for estimating each distance separating their spacecraft from one of the other spacecraft of the group on the basis at least of the signals received by each of the antennas; in this case its processor means can be responsible for determining the relative positions of the spacecraft of the group with respect to a chosen system of axes on the basis of the estimated distances and the estimated signal send directions;

its second measuring means can be responsible for estimating each distance separating their spacecraft from one of the other spacecraft of the group on the basis of the signals received by each of the antennas and auxiliary signals sent by the other spacecraft of the group and representative of corresponding distance measurements that they have effected at their end;

its storage means can store sets of cartographic data representative of powers normalized with respect to a reference level; in this case the processor means are responsible for analyzing the (measured) powers of each set of powers delivered by the first measuring means in order to determine, for example, the maximum power in each of them (which then becomes the reference power (or level) for the measurement) and applying to the signals received (from the same spacecraft), during a chosen period, a gain chosen to normalize the powers of the signals received with respect to the reference power (or level);

it can comprise analyzer means responsible for detecting collision risks from the relative positions of the spacecraft of the group;

the analyzer means can be responsible, in the event of detecting a collision risk, for determining an avoidance maneuver for their spacecraft as a function of the relative positions of the other spacecraft of the group;

it can include control means responsible for controlling return of the formation to a nominal geometry, starting from geometrical and kinematic conditions obtained after a collision avoidance maneuver and after returning all satellites to a healthy condition;

the send/receive antennas can be responsible for sending and/or receiving radio-frequency signals taking the form of a carrier modulated by chosen pseudo-random codes;

the send/receive antennas can be responsible for sending/receiving carriers at a frequency belonging to a chosen frequency band in a group comprising the S, SHF and EHF bands.

The invention also proposes a spacecraft intended to travel in formation in a group of spacecraft of the same type and including a control device of the type described above.

The invention is particularly suited to spacecraft such as satellites or aircraft, although not exclusively so.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The appended drawings constitute part of the description of the invention as well as contributing to the definition of the invention, if necessary.

An object of the invention is for a control device installed in a spacecraft of a group of spacecraft traveling in formation to be able to determine line of sight axes, and where applicable relative positions of spacecraft, or even to determine the risk of collision, associated avoidance maneuvers and possibly a nominal reconfiguration.

It is considered hereinafter by way of nonlimiting example that the spacecraft of the group are remote sensing satellites traveling (or intended to travel) in formation in order to carry out a space or terrestrial remote sensing mission.

The invention is not limited to this type of spacecraft, however. It relates to all spacecraft intended to fly in formation in a selected configuration (which where applicable can be modified).

Figure 1:
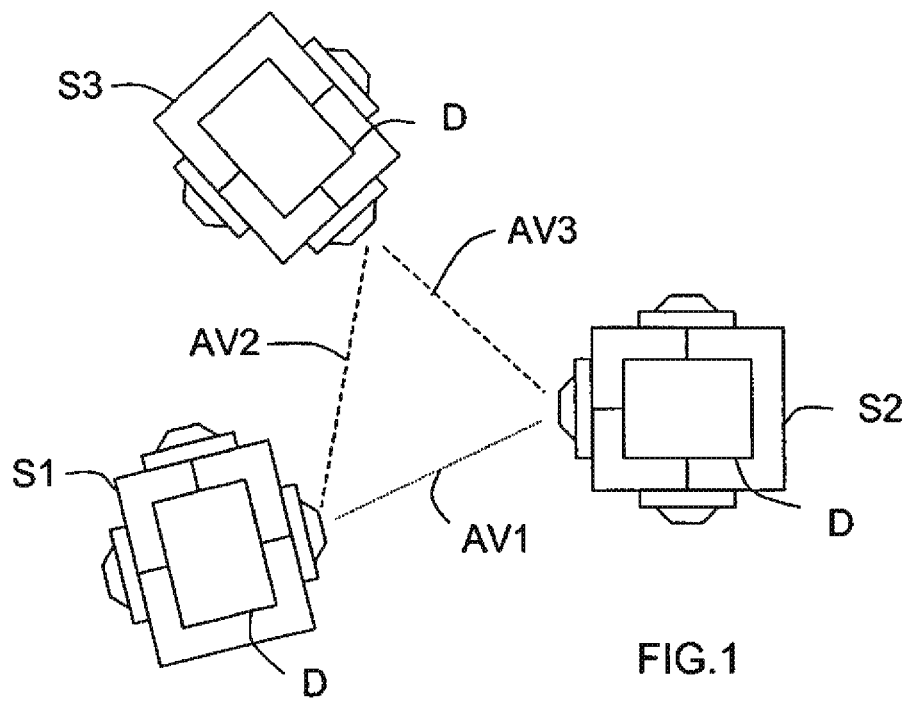
FIG. 1 shows very diagrammatically a group of three satellites in formation, each incorporating a control device of the invention.
Figure 2:
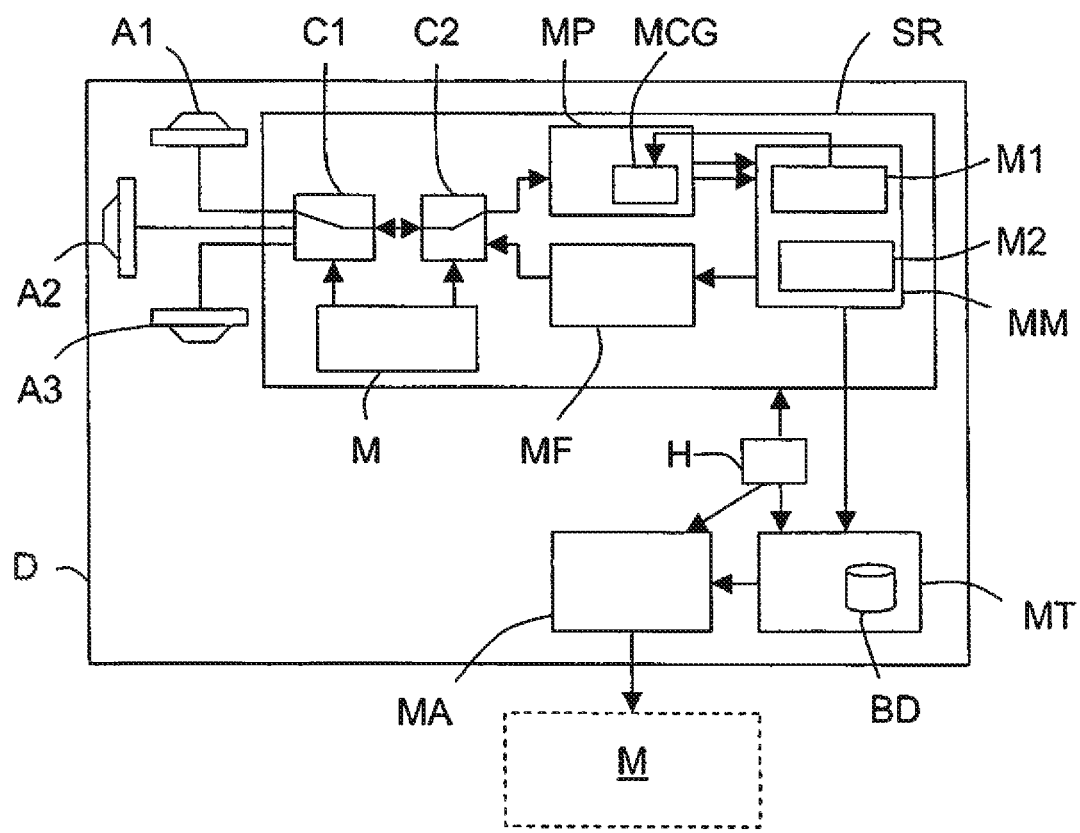
FIG. 2 shows very diagrammatically and functionally one embodiment of a control device of the invention.

Refer firstly to FIGS. 1 and 2, which show a group of spacecraft (satellites) to which the invention can be applied.

In FIG. 1 are represented a group of three satellites Si (i=1 to 3) flying in formation. It is important to note that the invention is not limited to groups comprising three spacecraft. It relates to any group comprising two or more spacecraft.

Within such groups, at least one of the satellites Si (S1 to S3) includes a control device D of the invention. However, it is advantageous for each satellite of a group (or a formation) to have its own device D.

A control device D of the invention comprises at least one subsystem consisting of at least three send/receive antennas Aj installed at chosen locations on at least three faces with different orientations of the satellite Si that it equips. In the example shown in FIGS. 1 and 2, each device D has only three antennas Aj (j=1 to 3). However, a set may include more than three antennas. This is the case in particular of the set shown in FIG. 4, which includes six antennas (j=1 to 6) installed on the six faces of a satellite S1. For example, each antenna Aj of a set is installed substantially at the center of one satellite face Si. However, this is not obligatory.

Each antenna Aj is able to send and receive radio-frequency (RF) signals at a selected frequency f1.

These RF signals preferably take the form of carriers modulated by selected pseudo-random codes.

The frequency f1 is preferably in the S band. This is not obligatory, however. It can also be in the SHF band or the EHF band.

It is considered hereinafter that the frequency f1 is in the S band. For example, f1=2.1 GHz.

A control device D can include at least one complementary antenna installed on at least one of the faces of its satellite Si and dedicated exclusively to receiving RF signals at the frequency f1. For example, equipping one or more faces of a satellite Si with a send/receive antenna Aj and one or two complementary receive antennas can be envisaged.

According to the invention, each control device D also includes a measuring module MM, storage means BD, and a processor module MT.

The first measuring module MM includes a first measuring sub-module M1 for determining the power of the signals that are received by each of the antennas Aj (and the complementary antennas, if any) in order to deliver sets of data representing these power measurements, each set being associated with one of the other satellites Si' of the group to which its own satellite Si belongs.

For example, the first measuring module MM can determine the power of each signal received by an antenna Aj by measuring its signal to noise (S/N) ratio, which eliminates the need for the exact value of the gain (amplification/attenuation) introduced by the processing subsystem, given that the noise level is relatively well known.

The signal to noise (S/N) ratio can be measured by any technique known to the person skilled in the art. For example, the energy can be measured in a frequency band that contains the signal and an adjacent frequency band that does not contain the signal.

If the mission implies a wide dynamic range of the powers received from the various spacecraft (depending on whether the spacecraft are near or far away), especially for the power measurements, the control device D can include a gain control module MCG placed on the upstream side of the measuring module MM and coupled to it. This gain control module MCG is, to be more precise, an automatic gain control loop for attenuating/amplifying the signal to a level compatible with that processed by an analog/digital conversion stage. From one time period to another, corresponding to reception via another antenna or from another satellite, the received power level can vary considerably and therefore vary the gain introduced by the gain control module MCG. The measuring module MM must know this gain, in order to take account of it when calculating the power received on the upstream side of the MCG module. The MCG module therefore supplies the module MM with the gain value that it used in each time period.

In this case, the first measuring sub-module M1 preferably determines the power of each signal received by an antenna Aj as a function of the measured power of the digitized signal and the gain applied to it in the analog preprocessor module.

As shown diagrammatically in FIG. 2, the gain control module MCG is, for example, part of an analog/digital preprocessing module MP responsible for processing the received signals (in particular for controlling the applied gain control) and converting them into digital signals to feed the first measuring module MM.

For example, this analog/digital preprocessing module MP is coupled to the antennas Aj of the set (and to any complementary antennas) via a first routing module C1 and a second routing module C2.

The first routing module C1 provides the coupling with one or the other of the antennas as a function of instructions coming from the control module MC (see below).

The second routing module C2 is connected to an input/output of the first routing module C1 and, on the one hand, to the input of the analog/digital preprocessing module MP and, on the other hand to the output of an RF signal shaping module MF (for the send part for the RF signals intended for the other satellites Si'). Thus the control device D can operate either in signal receiving mode or in signal sending mode, as a function of instructions coming from the processor module MT.

The control device D includes a clock H for supplying clock signals necessary for the operation of at least some of its components, and notably necessary for controlling sending and receiving.

The storage means BD are responsible for storing sets of cartographic data that each represent the predetermined and normalized powers of the signals received by each of the antennas Aj (and any complementary antenna(s)) as a function of selected send directions. Normalization means that only the measured power ratios need to be considered, which are the only ones representative of the line of sight axis, independently of the distance between satellites. As will be seen later, it is important to effect exactly the same normalization in the processor module MT in order to be able to compare the magnitudes tabulated in the storage means BD with all measurements effected on an antenna of the spacecraft to be controlled.

The powers of the cartographic data are predetermined during a previous cartographic analysis, for example in an anechoic RF test chamber, or by simulation software fed by a model representing the respective locations of the various antennas, their environment, and their characteristics, notably their radiation characteristics.

Figure 3:
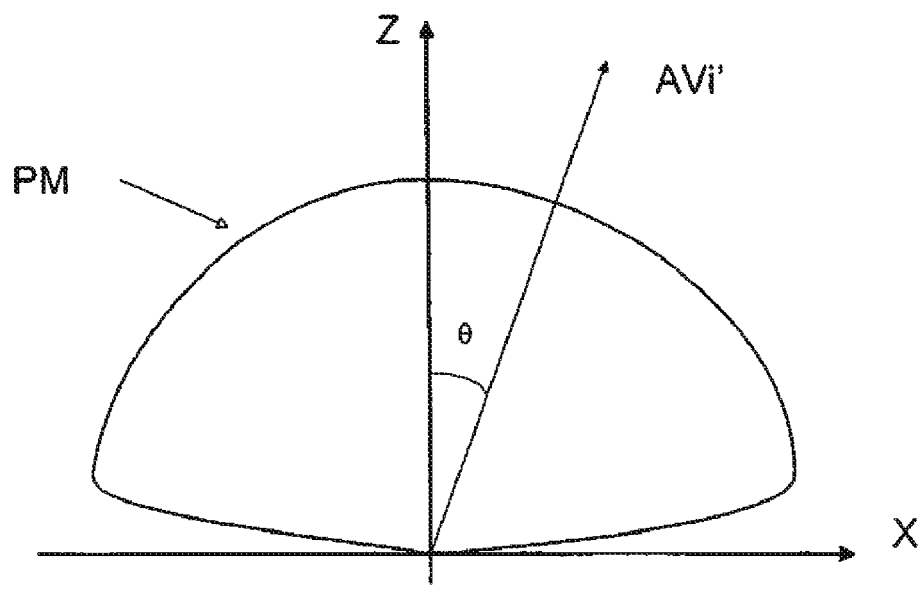
FIG. 3 shows diagrammatically in a polar form of representation one example of a received power (PM) diagram for an omnidirectional antenna with a hemispherical diagram as a function of the angle of incidence relative to its normal (Z)

FIG. 3 is a diagrammatic polar representation of one example of a diagram of the power PM received by an omnidirectional antenna as a function of the angle of incidence relative to its normal Z.

Figure 4:
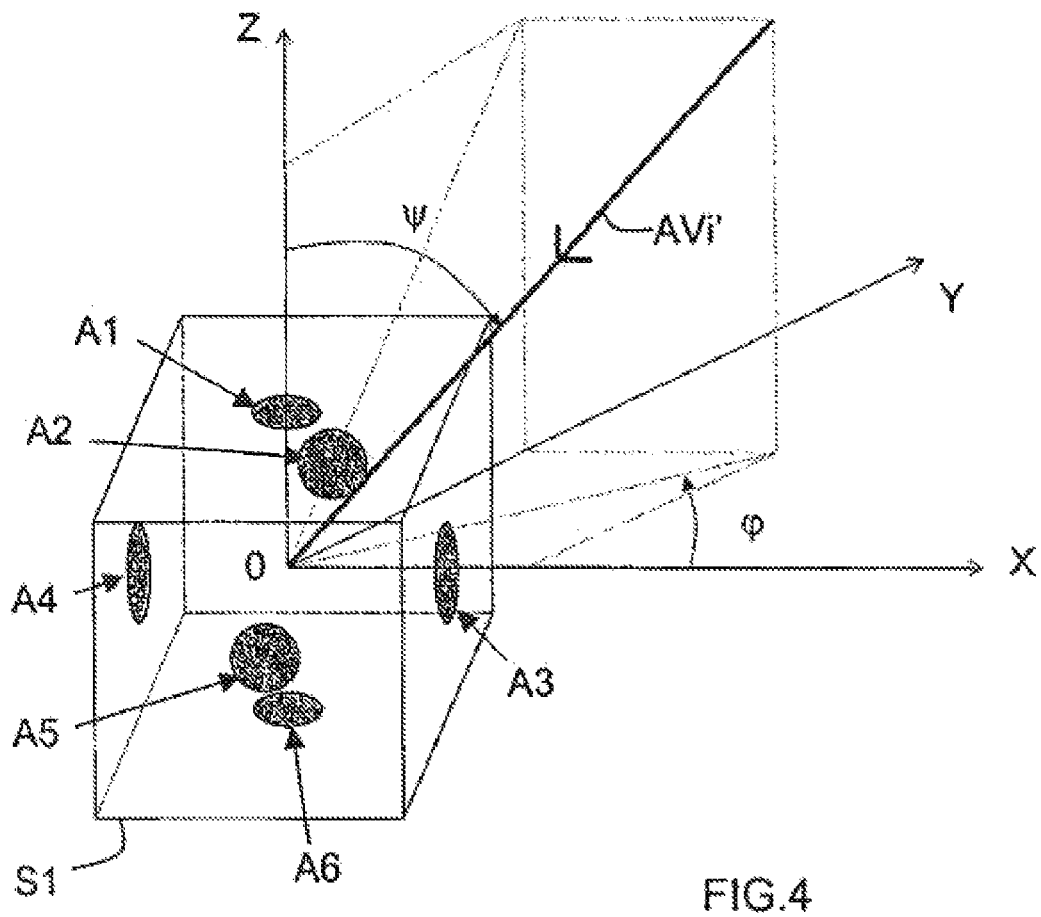
FIG. 4 shows very diagrammatically an example of positioning six antennas of a set of antennas on the faces of a satellite and the main parameters involved in determining coordinates of a line of sight axis.
Figure 5A:
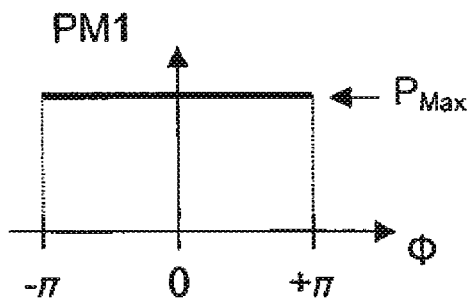
FIGS. 5A to 5F are examples of received power diagrams for the respective six antennas of the set from FIG. 4, as a function of the angle $\phi$ and when the angle $\psi$ is equal to 0 (relative to the X axis)
Figure 5B:
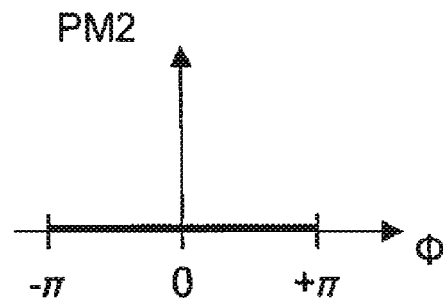
Figure 5C:
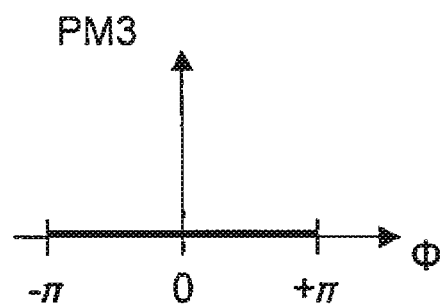
Figure 5D:
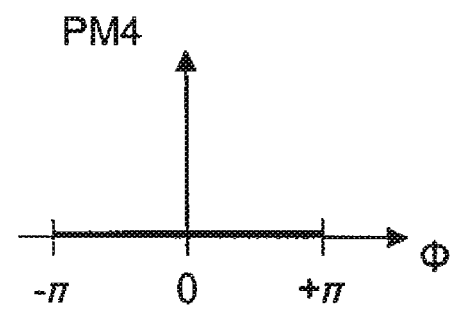
Figure 5E:
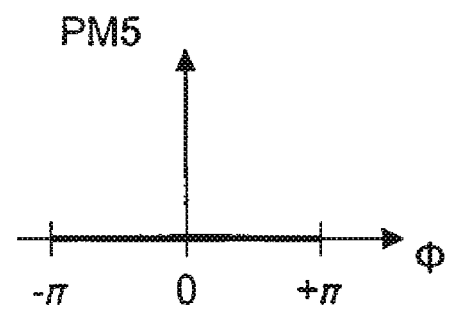
Figure 5F:
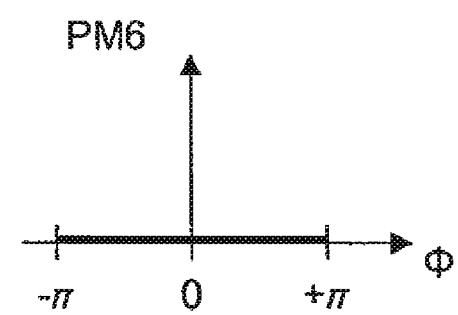
Figure 6A:
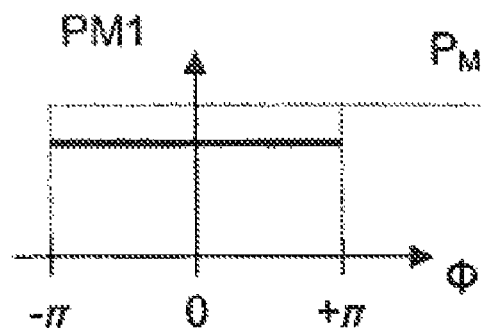
FIGS. 6A to 6F are examples of received power diagrams for the respective six antennas of the set from FIG. 4, as a function of the angle $\phi$ and when the angle $\psi$ is equal to $\pi/4$ (relative to the X axis)
Figure 6B:
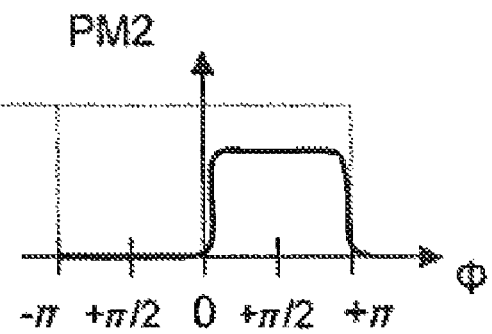
Figure 6C:
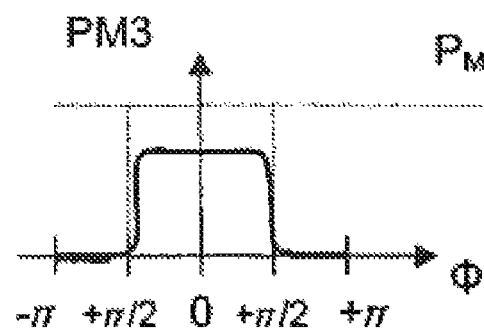
Figure 6D:
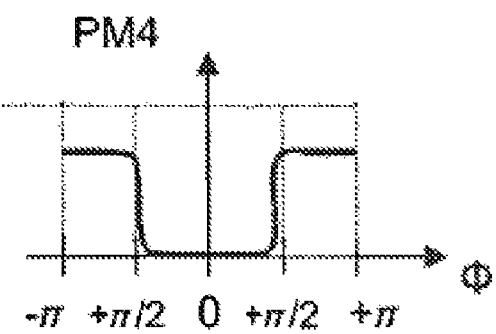
Figure 6E:
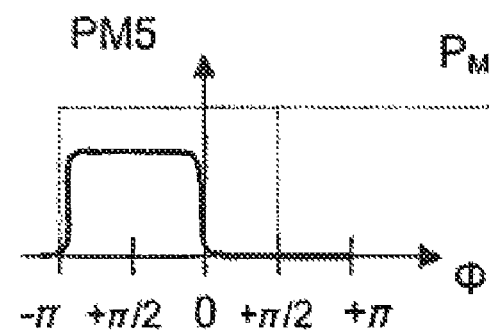
Figure 6F:
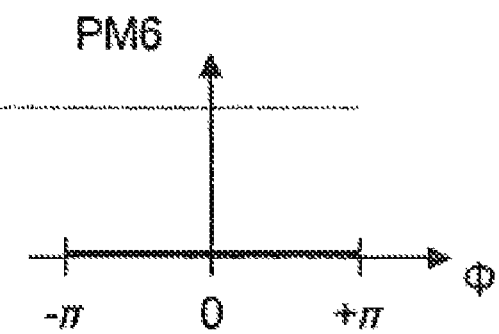
Figure 7A:
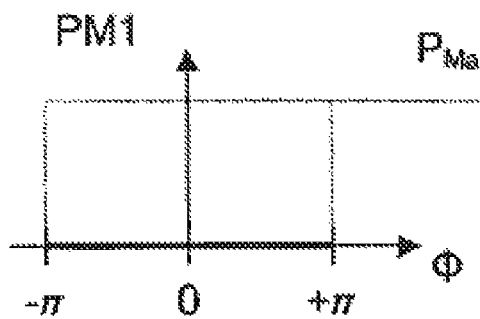
FIGS. 7A to 7F are examples of received power diagrams for the respective six antennas of the set from FIG. 4, as a function of the angle $\phi$ and when the angle $\psi$ is equal to $\pi/2$ (relative to the X axis)
Figure 7B:
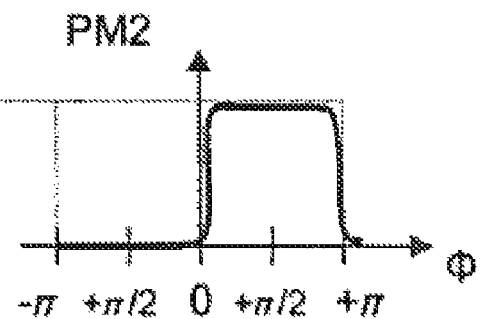
Figure 7C:
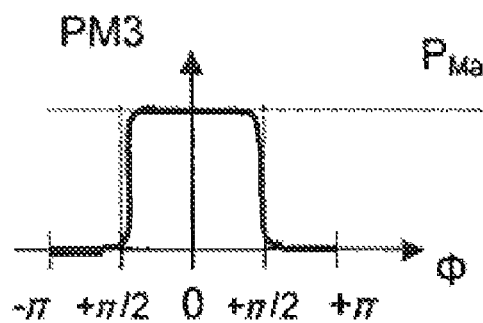
Figure 7D:
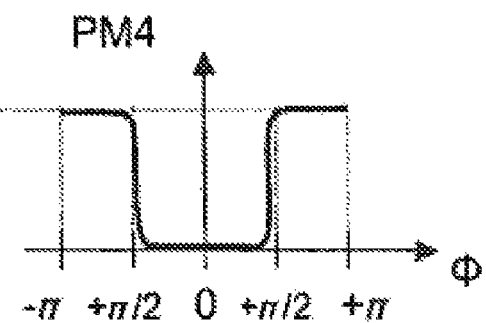
Figure 7E:
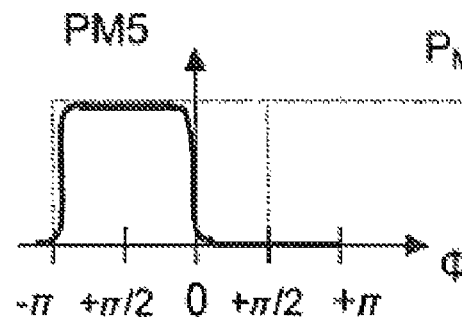
Figure 7F:
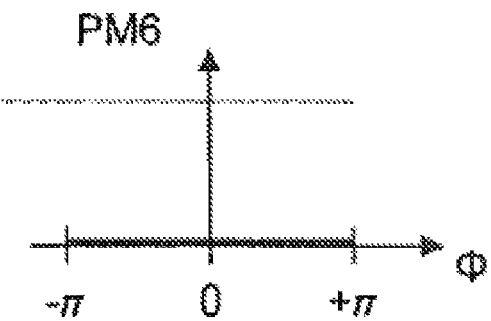
Figure 8A:
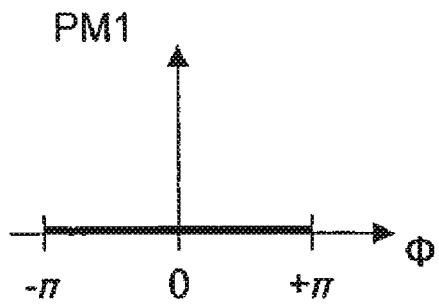
FIGS. 8A to 8F are examples of received power diagrams for the respective six antennas of the set from FIG. 4, as a function of the angle $\phi$ and when the angle $\psi$ is equal to $\pi$ (relative to the X axis).
Figure 8B:
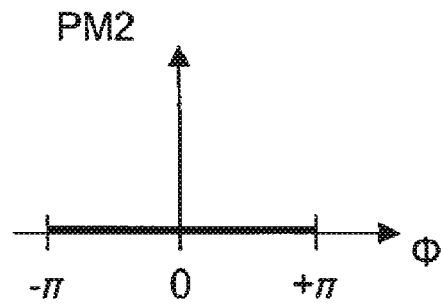
Figure 8C:
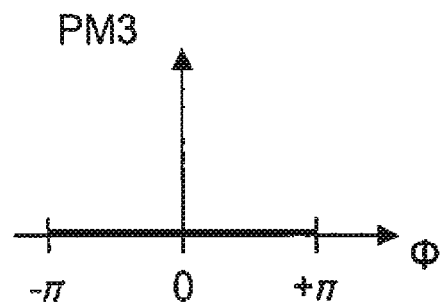
Figure 8D:
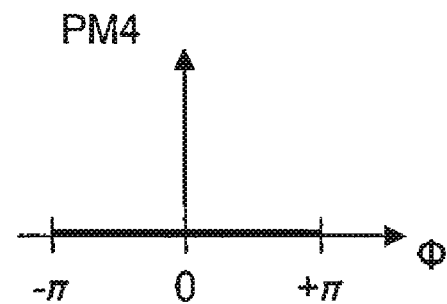
Figure 8E:
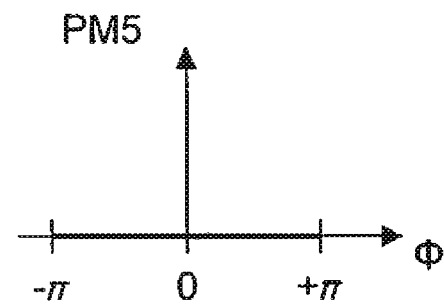
Figure 8F:
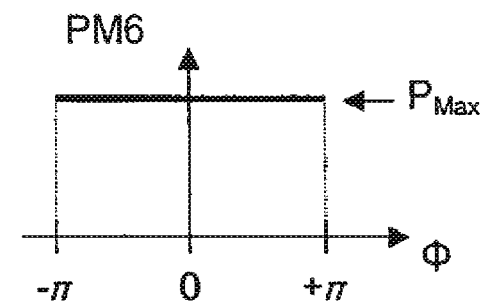

Also, FIGS. 5 to 8 show diagrammatically four examples of sets of six diagrams of the power PMj (j=1 to 6) received by the respective six antennas Aj of the set of antennas installed on the satellite Si shown by way of example in FIG. 4, for four respective different values of the angle ψ representing the elevation.

To be more precise, FIGS. 5A to 5F show six diagrams of the power (PM1 to PM6) received by the six antennas A1 to A6, respectively, as a function of the angle φ, representing the azimuth, and for an angle ψ equal to 0 with respect to the axis X of the system of axes (X, Y, Z). FIGS. 6A to 6F show six diagrams of the power (PM1 to PM6) received by the six antennas A1 to A6, respectively, as a function of the angle $\phi$, and for an angle $\psi$ equal to $\pi/4$ with respect to the axis X of the system of axes (X, Y, Z). FIGS. 7A to 7F show six diagrams of the power (PM1 to PM6) received by the six antennas A1 to A6, respectively, as a function of the angle $\phi$, and for an angle $\psi$ equal to $\pi/2$ with respect to the axis X of the system of axes (X, Y, Z). FIGS. 8A to 8F show six diagrams of the power (PM1 to PM6) received by the six antennas A1 to A6, respectively, as a function of the angle $\phi$, and for an angle $\psi$ equal to n with respect to the axis X of the system of axes (X, Y, Z).

In FIGS. 5 to 8, the sets of six diagrams are normalized relative to a selected reference level $P_{max}$ that represents the maximum value of the power PMj received by the (six) antennas Aj of the same set regardless of the values of the angles $\phi$ and $\psi$. Another possible normalization is to determine the norm 2 of the vector of the powers measured at each antenna and to divide the raw power measurements (i.e. the measurements received but not processed) by the value of that norm 2 of the measured power vector, for example. In this case, the vector of the received powers measured at each antenna and then normalized by the processor module MT, and the received power vectors tabulated in the storage means BD as a function of the line of sight axis then all have a norm 2 equal to 1.

Each set of cartographic data stored in the storage means BD is constructed from (predetermined) sets of power diagrams of the type shown in FIGS. 5 to 8. In the presence of normalized powers, each set of cartographic data is representative of powers normalized relative to the reference level $P_{Max}$, for example, or relative to the norm 2 of the power vector (as indicated above).

Any type of storage means BD can be envisaged, notably a memory or a database.

Moreover, in the nonlimiting example shown in FIG. 2, the storage means BD are installed in the processor module MT. This is not obligatory, however.

The processor module MT is responsible for comparing each set of power measurements delivered by the first measuring sub-module M1 to the sets of cartographic data that are stored in the storage means BD. This comparison is intended to estimate each send direction (or line of sight axis) AVi' of the signals received by the antennas Aj from the other satellites Si' of the group with respect to a system of axes (X, Y, Z) fixed with respect to the satellite Si, of the type shown in FIG. 4. This system of axes is fixed with respect to the center of mass O of the satellite Si, for example, but this is not obligatory.

In fact, each time the processor module MT receives a set of power measurements from the first measuring sub-module M1, it begins by normalizing the measured powers of the received set using a technique identical to that used when calculating and storing cartographic data.

To be more precise, the processor module MT analyzes the power measurements of each set of power delivered by the first measuring subsystem M1 in order, for example, to determine the maximum power in that set. That maximum power is then considered as the reference power (or level) for the measurement. Thereafter the processor module MT applies to the signals received (from the same spacecraft) during a selected period a gain that is selected to normalize the powers of the signals received with respect to the reference level.

The processor module MT then searches the stored sets of cartographic data for that or those best matching the received set. It then either interpolates into the set of cartographic data the set of normalized received power measurements or identifies the received power vector tabulated in the cartographic data closest to the set of normalized received power measurements to deduce therefrom an estimate of the coordinates of the line of sight axis AVi'. In this way the processor module MT determines for its satellite Si the line of sight axis AVi' corresponding to each remote satellite Si'.

Two solutions for distinguishing between signals sent by the various remote satellites Si' can be envisaged.

A first solution assigns each satellite Si of a group its own sending frequency and equips it with multifrequency antennas Aj. In this case, which corresponds to frequency-division multiplexing, each first measuring sub-module M1 constructs each set of power measurements by grouping the signals coming from the antennas Aj of the set at the same frequency (associated with one remote satellite Si').

A second solution assigns each spacecraft Si its own pseudo-random code. In this case, which corresponds to code division multiplexing, each first measuring sub-module M1 constructs each set of power measurements by grouping the signals that come from antennas Aj of the set and have the same code (associated with one remote satellite Si').

A third solution uses time-division multiplexing within the group of satellites Si. To be more precise, each satellite Si is assigned a time period during which it alone is authorized to send RF signals to the other satellites, according to a selected scheme. For example, in the presence of three satellites S1 to S3, a first send time period TE1 is assigned to the first satellite S1, a second send time period TE2 is assigned to the second satellite S2, coming just after the first send time period TE1, and a third send time period TE3 is assigned to the third satellite S3, coming just after the second send time period TE2 and just before the first send time period TE1 of the next time period.

During the send time periods TEi' during which a satellite Si does not send, it has a receive time period TRi equal to the sum of the send time periods TEi' of the other satellites Si'.

In this embodiment (using time-division multiplexing), it is advantageous for the control device D to include a control module MC responsible firstly for dividing the send time periods TEi and receive time periods TRi assigned to its satellite Si into numbers Nij of send sub-slices TEij and receive sub-slices TRij each equal to the number of send/receive antennas Aj (and any complementary antenna(s)) of its satellite Si.

The control module MC is then responsible, on the one hand, for assigning a send sub-slice TEij to each send/receive antenna Aj of its control device D, as a function of a first selected order, and, on the other hand, a receive sub-slice TRij to each of the send/receive antennas (and any complementary receive antenna(s)) as a function of a second selected order.

Thus each send/receive antenna Aj is authorized, on the one hand, to send during the send sub-slice TEij assigned to it and, on the other hand, to receive during the receive sub-slice TRij assigned to it. As a result, each set of powers that is delivered by the first measuring sub-module M1 concerns signals that have been received by the various antennas Aj during their respective receive sub-slices TRij.

The control module MC can set the first and second orders of the send sub-slices TEij and receive sub-slices TRij once and for all.

This is very suitable for a send time distribution scheme in which each spacecraft Si sends via all its antennas simultaneously.

However, simultaneous sending by a number of antennas can degrade certain line of sight axis directions if the antennas have radiation diagrams that are not completely exclusive. To avoid this problem, it is possible to choose a send time distribution scheme in which each spacecraft Si sends via its various antennas successively.

In this case, it is not possible to measure simultaneously the power received by the various antennas of a spacecraft Si and sent by the same antenna of another spacecraft Si'. If the time sub-slice assigned to the second spacecraft for sending via its antenna No. 1 coincides with the time sub-slice assigned to the first spacecraft for receiving via its antenna No. 1, it cannot coincide with the sub-slice assigned to the first spacecraft on another receive antenna. That other receive antenna has a sub-slice that coincides with that of another antenna of the second spacecraft. It is therefore advantageous to have the ordering of the sub-slices assigned to the various receive antennas of the spacecraft evolve with time, in order to collect all the power measurements sequentially.

Each order can be varied periodically, for example every 5 or 10 seconds.

When the processor module MT is in possession of the coordinates of a line of sight axis AVi', it can determine the distance separating its satellite Si from the satellite Si' on that line of sight axis AVi'.

To this end, the control device D must comprise, preferably in its first measuring module MM, a second measuring sub-module M2. This is more precisely responsible for estimating each distance separating its satellite Si from another satellite Si' of the same group on the basis at least of the RF signals received by each of the antennas Aj from that other satellite Si'.

Because of the time skew introduced by the absence of highly accurate synchronization between the clocks H of the satellites Si of the group, each second measuring sub-module M2 preferably bases its distance estimate not only on RF signals received by each of the antennas Aj from another satellite Si' but also on auxiliary signals sent by that other satellite Si'.

These auxiliary signals preferably consist in modulation of the carrier of the signal by a selected pseudo-random code, and possibly information data, in order for the signal sent to image the local time of the sending spacecraft Si' and for observation of that signal to enable the receiver spacecraft Si to obtain a pseudo-distance measurement.

By comparing its own pseudo-distance measurement to that sent by a spacecraft (for example S2) in the form of information data in the auxiliary signals, the second measuring sub-module M2 of another spacecraft (for example S1) can isolate the clock skew and determine the distance d(S1, S2) between the spacecraft. The true distance is equal to half the sum of the pseudo-distance measured by the spacecraft S1 from the first signal sent by the spacecraft S2 and the pseudo-distance measured by the spacecraft S2 from the first signal sent by the spacecraft S1.

The second measuring sub-module M2 of a satellite Si then sends the processor module MT the value that has been determined of the distance d(Si, Si') between the spacecraft.

Knowing an intersatellite distance d(Si, Si') and the estimate of the corresponding line of sight axis AVi', the processor module MT can then determine the relative positions of the two satellites concerned (Si and Si') with respect to a chosen system of axes, for example the (X, Y, Z) system of axes that is fixed with respect to the satellite Si (or any other system of axes).

Thus each processor module MT can determine the relative positions of each satellite Si' of the group with respect to its satellite Si.

The second measuring sub-module M2 can implement a filter function intended to enable it to determine the relative speeds of the other satellites Si' with respect to the satellite Si in which it is installed from the relative position of each satellite Si' with respect to said satellite Si.

As shown in FIG. 2 by way of nonlimiting example, the control device D can equally comprise an analyzer module MA responsible for detecting risks of collision with other satellites Si' of the group from the relative positions of the satellites Si', which it has previously determined. Any type of collision risk detection known to the person skilled in the art can be used at this stage.

Each time that it detects a risk of collision, the analyzer module MA can also and where appropriate determine an avoidance maneuver for its satellite Si as a function of the relative positions of the other satellites Si' of the group. In this case, the analyzer module MA sends instructions defining this avoidance maneuver to the control module MD of the satellite Si, which is responsible for the latter's positioning. This can be one or more thrusters, for example, or any other actuator for controlling the attitude and the trajectory of the satellites.

The analyzer module MA or an additional control module can also be adapted to control return of the formation to a nominal geometry, starting from geometrical and kinematic conditions obtained after a collision avoidance maneuver and after returning all satellites to a healthy condition.

The control device D of the invention, and notably its processor module MT, its measuring module MM, and its control module MC and analyzer module MA, if any, can be produced in the form of electronic circuits, software (or electronic data processing) modules, or a combination of circuits and software.

Within the control device D, the measuring module MM, the routing modules C1 and C2, the preprocessor module MP, the beam forming module MF, and where appropriate the control module MC, can be combined in an entity constituting a sensor SR.

The invention is not limited to the embodiments of the control device and spacecraft described hereinabove by way of example only, and encompasses all variants that the person skilled in the art might envisage that fall within the scope of the following claims.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A control device (D) for a spacecraft (Si) of a group of spacecraft intended to travel in a chosen formation, comprising:
   a set of at least three send/receive antennas (Aj) installed on at least three differently oriented faces of said spacecraft (Si) and adapted to send/receive radio-frequency signals,
   processor means (MT) adapted to estimate the send directions of signals sent by the other spacecraft (Si') of the group on the basis of said signals received by said antennas (Aj),
   first measuring means (M1) adapted to determine the power of the signals received by each of said antennas (Aj) and to deliver sets of powers each associated with one of said other spacecraft (Si') of the group,
   storage means (BD) adapted to store sets of cartographic data each representative of the powers of the signals received by each of said antennas (Aj) as a function of chosen send directions, and control means (MC) adapted, in the event of assignment of a send time period and a complementary receive time period to each spacecraft of said group, in accordance with a chosen scheme, to divide the send and receive time periods assigned to their spacecraft (Si) into numbers of send sub-slices and receive sub-slices each equal to the number of send/receive antennas (Aj) of their spacecraft (Si), and to assign a send sub-slice to each of said send/receive antennas (Aj) in accordance with a first chosen order and a receive sub-slice to each of said send/receive antennas (Aj) according to a second chosen order, each send/receive antenna (Aj) being then authorized to send during the send sub-slice assigned to it and to receive during the receive sub-slice assigned to it, and each set of powers delivered relating to signals received by said send/receive antennas (Aj) during their respective receive sub-slices, wherein said processor means (MT) are adapted to compare each set of powers delivered by said first measuring means (M1) to said stored sets of cartographic data so as to estimate each send direction of the signals sent by the other spacecraft (Si') of the group with respect to a system of axes fixed with respect to said spacecraft (Si).

2. The device according to claim 1, wherein said storage means (BD) are adapted to store sets of cartographic data representative of powers normalized with respect to a reference level, and in that said processor means (MT) are adapted to analyze said powers of each set of powers delivered by said first measuring means (M1) in order to determine a reference power and to apply to the signals received from the same spacecraft (Si'), during a chosen period, a gain chosen to normalize the powers of said signals received with respect to said reference power.

3. The device according to claim 2, wherein said first measuring means (M1) are adapted to effect signal to noise ratio measurements for each of said received signals in order to determine the power of each received signal.

4. The device according to claim 2, comprising control means (MC) adapted, in the event of assignment of a send time period and a complementary receive time period to each spacecraft of said group, in accordance with a chosen scheme, to divide the send and receive time periods assigned to their spacecraft (Si) into numbers of send sub-slices and receive sub-slices each equal to the number of send/receive antennas (Aj) of their spacecraft (Si), and to assign a send sub-slice to each of said send/receive antennas (Aj) in accordance with a first chosen order and a receive sub-slice to each of said send/receive antennas (Aj) according to a second chosen order, each send/receive antenna (Aj) being then authorized to send during the send sub-slice assigned to it and to receive during the receive sub-slice assigned to it, and each set of powers delivered relating to signals received by said send/receive antennas (Aj) during their respective receive sub-slices.

5. The device according to claim 2, comprising second measuring means (M2) adapted to estimate each distance separating their spacecraft from one of said other spacecraft (Si') of the group on the basis at least of said signals received by each of said antennas (Aj), and in that said processor means (MT) are adapted to determine the relative positions of the spacecraft of said group with respect to a chosen system of axes on the basis of said estimated distances and said estimated signal send directions.

6. The device according to claim 1, wherein said first measuring means (M1) are adapted to effect signal to noise ratio measurements for each of said received signals in order to determine the power of each received signal.

7. The device according to claim 6, comprising control means (MC) adapted, in the event of assignment of a send time period and a complementary receive time period to each spacecraft of said group, in accordance with a chosen scheme, to divide the send and receive time periods assigned to their spacecraft (Si) into numbers of send sub-slices and receive sub-slices each equal to the number of send/receive antennas (Aj) of their spacecraft (Si), and to assign a send sub-slice to each of said send/receive antennas (Aj) in accordance with a first chosen order and a receive sub-slice to each of said send/receive antennas (Aj) according to a second chosen order, each send/receive antenna (Aj) being then authorized to send during the send sub-slice assigned to it and to receive during the receive sub-slice assigned to it, and each set of powers delivered relating to signals received by said send/receive antennas (Aj) during their respective receive sub-slices.

8. The device according to claim 6, comprising second measuring means (M2) adapted to estimate each distance separating their spacecraft from one of said other spacecraft (Si') of the group on the basis at least of said signals received by each of said antennas (Aj), and in that said processor means (MT) are adapted to determine the relative positions of the spacecraft of said group with respect to a chosen system of axes on the basis of said estimated distances and said estimated signal send directions.

9. The device according to claim 1, wherein said control means (MC) are adapted to vary said first chosen order and/or said second chosen order.

10. The device according to claim 1, comprising second measuring means (M2) adapted to estimate each distance separating their spacecraft from one of said other spacecraft (Si') of the group on the basis at least of said signals received by each of said antennas (Aj), and in that said processor means (MT) are adapted to determine the relative positions of the spacecraft of said group with respect to a chosen system of axes on the basis of said estimated distances and said estimated signal send directions.

11. The device according to claim 10, wherein said second measuring means (M2) are adapted to estimate each distance separating their spacecraft (Si) from one of said other spacecraft (Si') of the group on the basis of said signals received by each of said antennas (Aj) and auxiliary signals sent by said other spacecraft (Si') of the group and representative of corresponding distance measurements between them (Si') and said spacecraft (Si).

12. The device according to claim 11, comprising analyzer means (MA) adapted to detect collision risks from said relative positions of the spacecraft of said group.

13. The device according to claim 10, comprising analyzer means (MA) adapted to detect collision risks from said relative positions of the spacecraft of said group.

14. The device according to claim 13, wherein said analyzer means (MA) are adapted, in the event of detecting a collision risk, to determine an avoidance maneuver of said spacecraft (Si) as a function of said relative positions of the other spacecraft (Si') of said group.

15. The device according to claim 14, including control means adapted, after a collision avoidance maneuver, to determine nominal reconfiguration maneuvers for the spacecraft (Si) of said group as a function of their relative positions after said collision avoidance maneuver.

16. The device according to claim 1, wherein said send/receive antennas (Aj) are adapted to send and/or receive radio-frequency signals taking the form of a carrier modulated by chosen pseudo-random codes.

17. The device according to claim 1, wherein said send/receive antennas (Aj) are adapted to send/receive carriers at a frequency belonging to a chosen frequency band in a group comprising the S, SHF and EHF bands.

18. The device according to claim 17, wherein said frequency band is the S band.

19. A spacecraft (Si) intended to travel in formation in a group of spacecraft of the same type, including a control device (D) according to claim 1.

* * * * *